(12) United States Patent
Eichenauer et al.

(10) Patent No.: US 7,060,741 B2
(45) Date of Patent: Jun. 13, 2006

(54) POLYMER COMPOSITIONS WITH IMPROVED PROPERTY CONSTANCY

(75) Inventors: Herbert Eichenauer, Dormagen (DE); Adolf Schmidt, Adelsheim (DE); Ulrich Jansen, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/204,294

(22) PCT Filed: Feb. 12, 2001

(86) PCT No.: PCT/EP01/01493

§ 371 (c)(1),
(2), (4) Date: Aug. 20, 2002

(87) PCT Pub. No.: WO01/62848

PCT Pub. Date: Aug. 30, 2001

(65) Prior Publication Data

US 2003/0092836 A1    May 15, 2003

(30) Foreign Application Priority Data

Feb. 23, 2000 (DE) .................. 100 08 420

(51) Int. Cl.
*C08L 51/04* (2006.01)
(52) U.S. Cl. ................ 523/201; 525/67; 525/71; 525/66
(58) Field of Classification Search ............ 525/71, 525/83–86, 66, 67; 523/201
See application file for complete search history.

(56) References Cited

U.S. PATENT DOCUMENTS

| 3,553,167 A | 1/1971 | Schnell et al. | |
| 3,692,744 A | 9/1972 | Rich et al. | |
| 4,009,226 A | 2/1977 | Ott et al. | |
| 4,075,173 A | 2/1978 | Maruyama et al. | |
| 4,156,069 A | 5/1979 | Prevorsek et al. | 528/182 |
| 4,181,788 A | 1/1980 | Wingler et al. | 526/68 |
| 4,269,964 A | 5/1981 | Freitag et al. | 528/126 |
| 4,311,823 A | 1/1982 | Imai et al. | 528/181 |
| 4,713,420 A | 12/1987 | Henton | 525/236 |
| 4,732,949 A | 3/1988 | Paul et al. | 525/464 |
| 4,772,743 A | 9/1988 | Schmidt et al. | 560/86 |
| 4,874,815 A | 10/1989 | Bubeck et al. | 525/71 |
| 5,071,946 A | 12/1991 | Schmidt et al. | 528/306 |
| 5,227,458 A | 7/1993 | Freitag et al. | 528/196 |
| 5,674,940 A | 10/1997 | Eichenauer et al. | 525/71 |
| 5,719,232 A | 2/1998 | Schmidt et al. | 525/86 |
| 5,741,853 A | 4/1998 | Eichenauer et al. | 525/71 |
| 5,883,190 A * | 3/1999 | Eichenauer | 525/71 |
| 5,969,041 A * | 10/1999 | Eichenauer et al. | 525/71 |

FOREIGN PATENT DOCUMENTS

| DE | 2232877 | 1/1974 |
| EP | 0 436 381 | 7/1991 |
| EP | 0 818 480 | 1/1998 |
| EP | 0 845 496 | 6/1998 |
| EP | 0 845 497 | 6/1998 |

OTHER PUBLICATIONS

Kunststoff Handbuch, vol. VIII, p. 695-742, (month unavailable) 1973, "Polyalkylenterephthalate", Klaus-Dieter Asmus.

* cited by examiner

*Primary Examiner*—Jeffrey Mullis
(74) *Attorney, Agent, or Firm*—Jill Denesvich

(57) ABSTRACT

The present invention provides polymer compositions of special graft rubber polymers, in the production of which are employed rubbers with defined particle diameters obtained by seed polymerization using seed latex particles with defined particle diameters.

8 Claims, No Drawings

POLYMER COMPOSITIONS WITH IMPROVED PROPERTY CONSTANCY

FIELD OF THE INVENTION

ABS molding compositions or molding compositions of the ABS type have already been used for many years in large amounts as thermoplastic resins for producing molded parts of all types. In this connection the property spectrum of these resins can be varied within wide ranges.

BACKGROUND OF THE INVENTION

Particularly important properties of ABS molding compositions that may be mentioned include toughness (impact strength, notched impact strength) modulus of elasticity, processability (MVR), heat resistance, surface gloss, attention being paid to specific property combinations depending on the area of use.

A particularly important feature for the processing of ABS molding compositions, particularly when using fully automated production plants, is the constancy of the properties or property combinations of the molding compositions to be processed.

Although products with relatively narrow tolerance limits can be produced by using modern processes in the ABS production (for example computerized control of polymerization and compounding), nevertheless for special applications it is necessary to have even more improved constant properties that can be achieved only via the product composition or the product structure.

SUMMARY OF THE INVENTION

The object therefore existed of producing thermoplastic molding compositions of the ABS type that exhibit from batch to batch very constant values for the most important properties also in the case of variations in the individual components that are used. The object according to the invention is achieved by using combinations of special graft rubber polymers in the production of which are employed rubbers with defined particle diameters obtained by seed polymerization using seed latex particles with defined particle diameters.

The invention provides polymer compositions containing

I) at least one graft rubber polymer obtained by emulsion polymerization of styrene and acrylonitrile in a weight ratio of 95:5 to 50:50, styrene and/or acrylonitrile being able to be partially or completely replaced by α-methylstyrene, methyl methacrylate or N-phenylmaleimide or mixtures thereof, in the presence of a butadiene polymer latex (A) with a mean particle diameter $d_{50}$ of 230 to 330 nm, preferably 240 to 320 nm, and particularly preferably 250 to 310 nm, II) at least one graft rubber polymer obtained by emulsion polymerization of styrene and acrylonitrile in a weight ratio of 95:5 to 50:50, styrene and/or acrylonitrile being able to be completely or partially replaced by α-methyl-styrene, methyl methacrylate or N-phenylmaleimide or mixtures thereof, in the presence of a butadiene polymer latex (B) with a mean particle diameter $d_{50}$ of 340 to 480 nm, preferably 350 to 470 nm, and particularly preferably 360 to 460 nm, optionally III) at least one graft rubber polymer obtained by emulsion polymerization of styrene and acrylonitrile in a weight ratio of 95:5 to 50:50, wherein styrene and/or acrylonitrile can be wholly or partially replaced by α-methyl styrene, methyl methacrylate or N-phenylmaleimide or mixtures thereof, in the presence of a butadiene polymer latex (C) and IV) at least one rubber-free copolymer of styrene and acrylonitrile in a weight ratio of 95:5 to 50:50, wherein styrene and/or acrylonitrile can be wholly or partially replaced by α-methyl styrene, methyl methacrylate or N-phenyl-maleimide or mixtures thereof characterized in that the butadiene polymer latices (A) and (B) are obtained by seed polymerization using at least one butadiene polymer latex (C) with a mean particle diameter of 10 to 220 nm, preferably 20 to 210 nm and particularly preferably 30 to 200 nm as seed latex, and the graft rubber component III) is obtained by graft polymerization in the presence of at least one butadiene polymer latex (C) used as seed latex for (A) and (B).

The present invention also provides a process for producing the polymer compositions according to the invention wherein the butadiene polymer latices (A) and (B) are obtained by seed polymerization using at least one butadiene polymer latex (C) having a mean particle diameter of 10 to 220 nm as a seed latex and the graft rubber component III) is obtained by graft polymerization in the presence of at least one butadiene polymer latex (C) used as seed latex for (A) and (B).

In general the polymer compositions according to the invention may contain the graft rubber components (I) and (II) and optionally (III) in arbitrary amounts, preferably in amount of 1 to 60 parts by weight, particularly preferably in amounts of 5 to 50 parts by weight, and the rubber-free resin component (IV) preferably in amounts of 40 to 99 parts by weight, particularly preferably in amounts of 50 to 95 parts by weight.

The weight ratio of (I):(II):(III) may be varied within wide limits; normally the weight ratio of (I):(II) is 90:10 to 10:90, preferably 80:20 to 20:80 and particularly preferably 70:30 to 35:65, and when (III) is used in addition the weight ratio [(I)+(II)]:(III) is 10:90 to 80:20, preferably 20:80 to 70:30, and particularly preferably 25:75 to 65:35.

Apart from the aforementioned polymer components the polymer compositions according to the invention may contain further rubber-free thermoplastic resins not built up from vinyl monomers, these thermoplastic resins being used in amounts of up to 1000 parts by weight, preferably up to 700 parts by weight and particularly preferably up to 500 parts by weight (in each case referred to 100 parts by weight of I+II+III+IV).

The butadiene polymer latices (A), (B) and (C) are produced by emulsion polymerisation of butadiene according to the so-called seed polymerization technique, in which first of all a finely particulate polymer, preferably a butadiene polymer, is produced as seed latex and is then polymerized further with butadiene-containing monomers into larger particles (see for example in Houben-Wyl, Methoden der Organischen Chemie, Makromolekulare Stoffe, Part 1, p. 339 (1961), Thieme Verlag Stuttgart). In this connection the process is preferably carried out using a seed batch process or a continuous seed flow process.

As comonomers there may be used up to 50 wt. % (referred to the total amount of monomer used for butadiene polymer production) of one or more monomers copolymerizable with butadiene.

Examples of such monomers include isoprene, chloroprene, acrylonitrile, styrene, α-methyl styrene, $C_1$-$C_4$-alkyl-styrenes, $C_1$-$C_8$-alkyl acrylates, $C_1$-$C_8$-alkyl methacrylates, alkylene glycol diacrylates, alkylene glycol dimethacrylates, divinyl benzene; butadiene is preferably used alone or mixed with up to 20 wt. %, preferably with up to 10 wt. %, of styrene and/or acrylonitrile.

As seed latex polymers there are preferably used butadiene polymers such as polybutadiene, butadiene/styrene copolymers, butadiene/acrylonitrile copolymers, or polymers obtained from the aforementioned monomers.

In principle there may also be used other finely particulate latex polymers, for example polystyrene or styrene copolymers, poly(methyl methacrylate) or methyl methacrylate copolymers, as well as polymers of other vinyl monomers.

Preferred seed latex polymers are polybutadiene latices.

In this connection seed latices (C) with a mean particle diameter $d_{50}$ of 10 to 220 nm, preferably 20 to 210 nm and particularly preferably 30 to 200 nm are used in the production of the butadiene polymer latex (A) and butadiene polymer latex (B).

When using seed latices (C) with mean particle diameters $d_{50}$ above 80 nm, preferably above 90 nm and particularly preferably above 100 nm, the seed latices (C) themselves may also preferably be produced by seed polymerization. For this purpose there are preferably used seed latices (D) with mean particle diameters $d_{50}$ of 10 to 60 nm, preferably 20 to 50 nm.

The butadiene polymer latex (A) has a mean particle diameter $d_{50}$ of 230 to 330 nm, preferably 240 to 320 nm and particularly preferably 250 to 310 nm.

The gel content of (A) is 30 to 80 wt. %, preferably 40 to 75 wt. % and particularly preferably 45 to 70 wt. %.

The butadiene polymer (B) has a mean particle diameter $d_{50}$ of 340 to 480 nm, preferably 350 to 470 nm, and particularly 360 to 460 nm.

The gel content of (B) is 50 to 95 wt. %, preferably 55 to 90 wt. %, and particularly preferably 60 to 85 wt. %.

The butadiene polymer latex (C) has a mean partilce diameter $d_{50}$ of 10 to 220 nm, preferably 20 to 210 nm, and particularly preferably 30 to 200 nm.

The gel content of (C) is 30 to 98 wt. %, preferably 40 to 95 wt. %, and particularly preferably 50 to 92 wt. %.

The seed latex (D), preferably a butadiene polymer latex, has a mean particle diameter $d_{50}$ of 10 to 60 nm, preferably 20 to 50 nm.

The gel content of (D) is 10 to 95 wt. % preferably 20 to 90 wt. %, and particularly preferably 30 to 85 wt. %.

The mean particle diameter $d_{50}$ may be determined by ultracentrifuge measurements (see W. Scholtan, H. Lange: Kolloid Z. & Z. Polymere 250, p. 782 to 796 (1972)), the specified values for the gel content referring to the determination according to the wire cage method in toluene (see Houben-Weyl, Methoden der Organischen Chemie, Makromolekulare Stoffe, Part 1, p. 307 (1961), Thieme Verlag Stuttgart).

The gel contents of the butadiene polymer latices (A), (B), (C) and (D) may in principle be adjusted in a manner known per se by employing suitable reaction conditions (e.g. high reaction temperature and/or polymerization up to a high conversion, as well as optionally the addition of crosslinking substances in order to achieve a high gel content, or for example low reaction temperature and/or termination of the polymerization reaction before too high a degree of crosslinking has occurred, as well as optionally the addition of molecular weight regulators, such as for example n-dodecyl mercaptan or t-dodecyl mercaptan in order to achieve a low gel content). As emulsifiers there may be used conventional anionic emulsifiers such as alkyl sulfates, alkyl sulfonates, aralkyl sulfonates, soaps of saturated or unsaturated fatty acids, as well as alkaline disproportionated or hydrogenated abietinic acid or tall oil acid, and preferably emulsifiers are used containing carboxyl groups (e.g. salts of $C_{10}$-$C_{18}$ fatty acids, disproportionated abietinic acid, emulsifiers according to DE-OS 36 39 904 and DE-OS 39 13 509).

The preparation of the graft rubber polymers (I), (II) and (III) may be carried out in any appropriate manner by separate grafting of the butadiene polymer latices (A), (B) and (C) in separate reactions or by joint grafting of arbitrary mixtures selected from the butadiene polymer latices (A), (B) and (C) during one reaction or two reactions or three reactions.

In this connection the graft polymerization(s) may be carried out according to any suitable processes but is/are preferably carried out in such a way that the monomer mixture is continuously added to the butadiene polymer latex (A) and/or to the butadiene polymer latex (B) and/or to the butadiene polymer latex (C) and/or to arbitrary mixtures selected from the butadiene polymer latices (A), (B) and (C), and is polymerized.

In this connection special monomer/rubber ratios are preferably maintained and the monomers are added in a manner known per se to the rubber.

In order to produce the components (I), (II) and (III) according to the invention, preferably 15 to 50 parts by weight, particularly preferably 20 to 40 parts by weight, of a mixture of styrene and acrylonitrile that may optionally contain up to 50 wt. % (referred to the total amount of the monomers used in the graft polymerization) of one or more monomers, are polymerized in the presence of 50 to 85 parts by weight, preferably 60 to 80 parts by weight (in each case referred to solids) of the butadiene polymer latex (A) and/or of the butadiene polymer latex (B) and/or of the butadiene polymer latex (C) and/or arbitrary mixtures selected from the butadiene polymer latices (A), (B), and (C).

The monomers used in the graft polymerization are preferably mixtures of styrene and acrylonitrile in a weight ratio of 95:5 to 50:50, particularly preferably in a weight ratio of 80:20 to 65:35, wherein styrene and/or acrylonitrile may be wholly or partially replaced by copolymerizable monomers, preferably by α-methylstyrene, methyl methacrylate or N-phenylmaleimide. In principle arbitrary further copolymerizable vinyl monomers may additionally be used in amounts of up to ca. 10 wt. % (referred to the total amount of the monomers).

In addition molecular weight regulators may be used in the graft polymerization preferably in amounts of 0.01 to 2 wt. %, particularly preferably in amounts of 0.05 to 1 wt. % (in each case referred to the total amount of monomers in the graft polymerization stage).

Suitable molecular weight regulators are for example alkyl mercaptans such as n-dodecyl mercaptan, t-dodecyl mercaptan; dimeric α-methylstyrene, terpinolene.

Suitable initiators that may be used include inorganic and organic peroxide, e.g. $H_2O_2$, di-tert.-butyl peroxide, cumene hydroperoxide, dicyclohexyl percarbonate, tert.-butyl hydroperoxide, p-menthane hydroperoxide, azo initiators such as azobisisobutyronitrile, persalts such as ammonium, sodium or potassium persulfate, potassium perphosphate, sodium perborate, as well as redox systems. Redox systems consist as a rule of an organic oxidizing agent and a reducing agent, in which connection heavy metal ions may in addition be present in the reaction medium (see Houben-Weyl, Methoden der Organischen Chemie, Vol. 14/1, pp. 263 to 297).

The polymerization temperature is in general 25° C. to 160° C., preferably 40° C. to 90° C. Suitable emulsifiers are mentioned above.

The graft polymerization may be carried out under normal temperature conditions, i.e. isothermally; the graft polymerization is however preferably carried out so that the temperature difference between the start and end of the reaction is at least 10° C., preferably at least 15° C., and particularly preferably at least 20° C.

In order to produce the components I), II) and III) according to the invention, the graft polymerization may preferably be carried out by continuous addition of the monomers in such a way that 55 to 90 wt. %, preferably 60 to 80 wt. % and particularly preferably 65 to 75 wt. % of the total amount of monomers used in the graft polymerization are metered in during the first half of the overall time for metering in the monomers; the remaining proportion of the monomers is metered in within the second half of the overall time for metering in the monomers.

As rubber-free copolymers IV) there are preferably used copolymers of styrene and acrylonitrile in a weight ratio of 95:5 to 50:50, in which connection styrene and/or acrylonitrile may be wholly or partially replaced by α-methylstyrene, methyl methacrylate or N-phenylmaleimide.

Particularly preferred are copolymers IV) containing proportions of incorporated acrylonitrile units of <30 wt %.

These copolymers preferably have mean molecular weights $\overline{M}_w$ of 20,000 to 200,000 and intrinsic viscosities [η] of 20 to 110 ml/g (measured in dimethyl-formamide at 25° C.).

Details concerning the production of these resins are described for example in DE-A 2 420 358 and DE-A 2 724 360. Vinyl resins produced by bulk polymerization or solution polymerization have proved to be particularly suitable. The copolymers may be added alone or as an arbitrary mixture.

Apart from using thermoplastic resins built up from vinyl monomers, it is also possible to use polycondensates, for example aromatic polycarbonates, aromatic polyester carbonates, polyesters or polyamides as rubber-free copolymer in the molding compositions according to the invention. Suitable thermoplastic polycarbonates and polyester carbonates are known (see for example DE-A 1 495 626, DE-A 2 232 877, DE-A 2 703 376, DE-A 2 714 544, DE-A 3 000 610, DE-A 3 832 396, DE-A 3 077 934), which may be prepared for example by reacting diphenols of the formulae (V) and VI)

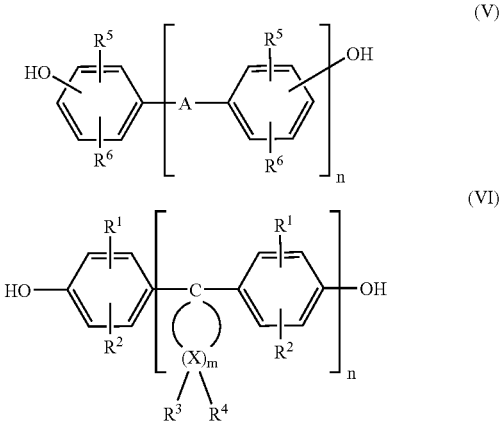

in which
A denotes a single bond $C_1$-$C_5$-alkylene, $C_2$-$C_5$-alkylidene, $C_5$-$C_6$-cycloalkylidene, —O—, —S—, —SO—, —$SO_2$— or —CO—,
$R^5$ and $R^6$ independently of one another denote hydrogen, methyl or halogen, in particular hydrogen, methyl, chlorine or bromine,
$R^1$ and $R^2$ independently of one another denote hydrogen, halogen, preferably chlorine or bromine, $C_1$-$C_8$-alkyl, preferably methyl, ethyl, $C_5$-$C_6$-cycloalkyl, preferably cyclohexyl, $C_6$-$C_{10}$-aryl, preferably phenyl, or $C_7$-$C_{12}$-aralkyl, preferably phenyl-$C_1$-$C_4$-alkyl, in particular benzyl,
m is an integer from 4 to 7, preferably 4 or 5,
n is 0 or 1,
$R^3$ and $R^4$ may be selected individually for each X and independently of one another denote hydrogen or $C_1$-$C_6$-alkyl, and
X denotes carbon, with carbonic acid halides, preferably phosgene, and/or with aromatic dicarboxylic acid dihalides, preferably benzenedicarboxylic acid dihalides, by phase boundary polycondensation, or with phosgene by polycondensation in the homogeneous phase (so-called pyridine process) in which connection the molecular weight may be adjusted in a manner known per se by adding an appropriate amount of known chain terminators.

Suitable diphenols of the formulae (V) and (VI) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-cyclohexane, 3,3-dimethylcyclohexane, 1,1-bis-(4-hydroxyphenyl)-3,3,5,5-trimethylcyclohexane or 1,1-bis-(4-hydroxyphenyl)-2,4,4,-trimethylcyclopentane.

Preferred diphenols of the formula (V) are 2,2-bis-(4-hydroxyphenyl)-propane and 1,1-bis-(4-hydroxyphenyl)-cyclohexane, and the preferred phenol of the formula (VI) is 1,1-bis-(4-hydroxyphenyl)-3,3,5-trimethylcyclohexane.

Mixtures of diphenols may also be used.

Suitable chain terminators are for example phenol, p-tert.-butylphenol, long-chain alkyl phenols such as 4-(1,3-tetramethylbutyl)phenol according to DE-A 2 842 005, monoalkylphenols, dialkylphenols having a total of 8 to 20 C atoms in the alkyl substituents according to DE-A 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The necessary amount of chain terminators is generally 0.5 to 10 mole % referred to the sum of the diphenols (V) and (VI).

The suitable polycarbonates or polyester carbonates may be linear or branched; preferred products are preferably obtained by incorporating 0.05 to 2.0 mole %, referred to the sum of the diphenols employed, of trifunctional or higher functionality compounds, for example those having three or more than three phenolic OH groups.

The suitable polycarbonates or polyester carbonates may contain aromatically bound halogen, preferably bromine and/or chlorine; however, they are preferably halogen-free.

The polycarbonates and polyester carbonates have mean molecular weights ($\overline{M}_w$, weight average), determined for example by ultracentrifugation or light scattering measurements, of 10,000 to 200,000, preferably 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) with aliphatic, cycloaliphatic or arylaliphatic diols and mixtures of such reaction products.

Preferred polyalkylene terephthalates can be prepared from terephthalic acids (or their reactive derivatives) and aliphatic or cycloaliphatic diols with 2 to 10 C atoms according to known methods (Kunststoff-Handbuch, Vol. VIII, p. 695 et. seq. Carl Hanser Verlag, Munich 1973).

In preferred polyalkylene terephthalates 80 to 100 mole %, preferably 90 to 100 mole % of the dicarboxylic acid residues are terephthalic acid residues, and 80 to 100 mole %, preferably 90 to 100 mole % of the diol residues are ethylene glycol residues and/or butanediol-1,4 residues.

The preferred polyalkylene terephthalates may in addition to ethylene glycol residues and/or butanediol-1,4 residues also contain 0 to 20 mole % of residues of other aliphatic diols with 3 to 12 C atoms or cycloaliphatic diols with 6 to 12 C atoms, for example residues of propanediol-1,3, 2-ethylpropanediol-1,3, neopentyl glycol, pentanediol-1,5, hexanediol-1,6, cyclohexanedimethanol-1,4, 3-methylpentanediol-1,3 and -1,6, 2-ethylhexanediol-1,3 2,2-diethylpropanediol-1,3, hexanediol-2,5, 1,4-di (β-hydroxyethoxy)-benzene, 2,2-bis-4-(hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by incorporating relatively small amounts of trihydroxy or tetrahydroxy alcohols or 3-basic or 4-basic carboxylic acids, as are described in DS-OS 1 900 270 and in US-A 3 692 744. Examples of preferred branching agents are trimesic acid, trimellitic acid, trimethylol ethane and trimethylol propane, and pentaerythritol. It is advisable to use not more than 1 mole % of the branching agent, referred to the acid component.

Particularly preferred are polyalkylene terephthalates that have been produced solely from terephthalic acid and its reactive derivatives (for example its dialkyl esters) and ethylene glycol and/or butanediol-1,4, and mixtures of these polyalkylene terephthalates.

Preferred polyalkylene terephthalates are also copolyesters that have been prepared from at least two of the abovementioned alcohol components: particularly preferred copolyesters are poly(ethyleneglycolbutanediol-1,4)-terephthalates.

The preferably suitable polyalkylene terephthalates generally have an intrinsic viscosity of 0.4 to 1.5 dl/g, preferably 0.5 to 1.3 dl/g, in particular 0.6 to 1.2 dl/g, measured in each case in phenol/o-dichlorobenzene (1:1 parts by weight) at 25° C.

Suitable polyamides are known homopolyamides, copolyamides and mixtures of these polyamides. These polyamides may be partially crystalline and/or amorphous.

Suitable partially crystalline polyamides are polyamide-6, polyamide-6,6, mixtures and corresponding copolymers prepared from these components. Also suitable are partially crystalline polyamides whose acid component consists wholly or partially of terephthalic acid and/or isophthalic acid and/or cork acid and/or sebacic acid and/or azelaic acid and/or adipic acid and/or cyclohexanedicarboxylic acid, whose diamine component consists wholly or partially of m- and/or p-xylylene diamine and/or hexamethylene diamine and/or 2,2,4-trimethylhexamethylene diamine and/or 2,2,4-trimethylhexamethylene diamine and/or isophorone diamine, and whose composition is in principle known.

There may also be mentioned polyamides that have been produced wholly or partially from lactams with 7 to 12 C atoms in the ring, optionally with the co-use of one or more of the abovementioned starting components.

Particularly preferred partially crystalline polyamides are polyamide-6 and polyamide-6,6 and their mixtures. As amorphous polyamides there may be used known products that are obtained by polycondensation of diamines such as ethylene diamine, hexamethylene diamine, decamethylene diamine, 2,2,4- and/or 2,4,4-trimethylhexamethylene diamine, m- and/or p-xylylene diamine, bis-(4-amino-cyclohexyl)-methane, bis-(4-aminocyclohexyl)-propane, 3,3'-dimethyl-4,4'-diaminodicyclohexylmethane, 3-aminomethyl-3,5,5,-trimethylcyclohexylamine, 2,5- and/or 2,6-bis-(aminomethyl)-norbarnane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of several monomers, as well as copolymers prepared with the addition of aminocarboxylic acids such as ε-aminocaproic acid, ω-aminoundecanoic acid or ω-aminolauric acid or their lactams.

Particularly suitable amorphous polyamides are the polyamides prepared from isophthalic acid, hexamethylene diamine and further diamines such as 4,4'-diamino-dicyclohexylmethane, isophorone, 2,2,4- and/or 2,4,4-trimethylhexamethylene diamine, 2,5- and/or 2,6-bis-(aminomethyl)-nobornene; or from isophthalic acid, 4,4'-diaminodicyclohexylmethane and ε-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylene diamine.

Instead of pure 4,4'-diaminodicyclohexylmethane, mixtures of the positional isomeric diaminodicyclohexylmethanes that are composed of the following components may also be used 70 to 99 mole % of the 4,4'-diamino isomer 1 to 30 mole % of the 2,4'-diamino isomer 0 to 2 mole % of the 2,2'-diamino isomer, and optionally correspondingly higher condensed diamines that are obtained by hydrogenating industrial quality diaminodiphenylmethane. The isophthalic acid may be replaced in an amount of up to 30% by terephthalic acid.

The polyamides preferably have a relative viscosity (measured in a 1 wt. % solution in m-cresol at 25° C.) of 2.0 to 5.0, particularly preferably 2.5 to 4.0.

Preferred molding compositions according to the invention contain 1 to 60 parts by weight, preferably 5 to 50 parts by weight of the graft polymer components I), II) and III), 40 to 99 parts by weight, preferably 50 to 95 parts by weight, of rubber-free copolymer.

The production of the molding compositions according to the invention is carried out by mixing the components I), II) and III) and IV) in conventional mixing units (preferably in multiple roll mills, mixing extruders or internal kneaders).

The invention accordingly also provides a process for producing the molding compositions according to the invention, wherein the components I), II) and III) and IV) are mixed and compounded at elevated temperature, in general at temperatures of 150° C. to 300° C., and are then extruded.

Necessary and/or advantageous additives, for example antioxidants, UV stabilizers, peroxide destroyers, antistatic agents, lubricating agents, mold release agents, flame protection agents, fillers or reinforcing materials (glass fibers, carbon fibers etc.) and pigments may be added to the molding compositions according to the invention during the production, processing, further processing and final shaping stages.

The final shaping may be carried out in conventional processing units, and includes for example processing by injection molding, sheet extrusion optionally followed by heat forming, cold forming, extrusion of pipes and profiled sections, and calendar processing.

In the following examples the specified parts are always parts by weight and the specified % are always wt. % unless otherwise stated.

EXAMPLES

Components

ABS Graft Polymer 1 (According to the Invention)

29 parts by weight (calculated as solids) of an anionically emulsified polybutadiene latex with a mean particle diameter $d_{50}$ of 289 mn and a gel content of 66 wt. %, produced by free-radical seed polymerization using a polybutadiene seed latex with a mean particle diameter $d_{50}$ of 118 nm, and 29 parts by weight (calculated as solids) of an anionically emulsified polybutadiene latex with a mean particle diameter $d_{50}$ of 399 mn and a gel content of 80 wt. % and produced by free-radical seed polymerization using a polybutadiene seed latex with a mean particle diameter $d_{50}$ of 137 nm, are adjusted with water to a solids content of ca. 20 wt. % heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperatures is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 2 (According to the Invention)

29 parts by weight (calculated as solids) of an anionically emulsified polybutadiene latex with a mean particle diameter $d_{50}$ of 289 nm and a gel content of 66 wt. %, produced by free-radical seed polymerization using a polybutadiene latex with a mean particle diameter $d_{50}$ of 118 nm, and 29 parts by weight (calculated as solids) of an anionically emulsified polybutadiene latex with a mean particle diameter $d_{50}$ of 410 nm and a gel content of 85 wt. % produced by free-radical seed polymerization using a polybutadiene seed latex with a mean particle diameter $d_{50}$ of 118 nm, are adjusted with water to a solids content of ca. 20 wt. %, then heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 3 (According to the Invention)

29 parts by weight (calculated as solids) of an anionically emulsified polybutadiene latex with a mean particle diameter $d_{50}$ of 289 nm and gel content of 66 wt. %, produced by free-radical seed polymerization using a polybutadiene latex with a mean particle diameter $d_{50}$ of 118 nm, and 29 parts by weight (calculated as solids) of an anionically emulsified polybutadiene latex with a mean particle diameter $d_{50}$ of 456 nm and a gel content of 76 wt. % produced by free-radical seed polymerization using a polybutadiene seed latex with a mean particle diameter $d_{50}$ of 137 nm, are adjusted with water to a solids content of ca. 20 wt. % heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant powder is dried 70° C.

ABS Graft Polymer 4 (According to the Invention)

29 parts by weight (calculated as solids) of an anionically emulsified polybutadiene latex with a mean particle diameter $d_{50}$ of 289 nm and a gel content of 66 wt. %, produced by free-radical seed polymerization using a polybutadiene seed latex with a mean particle diameter $d_{50}$ of 118 nm, and 29 parts by weight (calculated as solids) of an anionically emulsified polybutadiene latex with a mean particle diameter $d_{50}$ of 445 nm and a gel content of 84 wt. % produced by free-radical seed polymerization using a polybutadiene seed latex with a mean particle diameter $d_{50}$ of 137 nm, are adjusted with water to a solids content of ca. 20 wt. % heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 5 (Comparison)

The "ABS graft polymer 1" instructions are repeated, wherein a mixture of polybutadiene latices that have in each case been produced without using seed latex is employed (29 parts by weight of polybutadiene latex (calculated as solids) with a mean particle diameter $d_{50}$ of 299 nm and a gel content of 70 wt. % and 29 parts by weight of polybutadiene latex (calculated as solids) with a mean particle diameter $d_{50}$ of 391 nm and a gel content of 80 wt. %).

ABS Graft Polymer 6 (Comparison)

"ABS graft polymer 2" instructions are repeated, wherein a mixture of polybutadiene latices that have in each case been produced without using seed latex is employed (29 parts by weight of polybutadiene latex (calculated as solids) with a mean particle diameter $d_{50}$ of 299 nm and a gel content of 70 wt. %, and 29 parts by weight of polybutadiene latex (calculated as solids) with a mean particle diameter $d_{50}$ of 416 nm and a gel content of 87 wt. %).

ABS Graft Polymer 7 (Comparison)

The "ABS graft polymer 3" instructions are repeated, wherein a mixture of polybutadiene latices that have in each case been produced without using seed latex is employed (29 parts by weight of polybutadiene latex (calculated as solids) with a mean particle diameter $d_{50}$ of 282 nm and a gel content of 49 wt. %, and 29 parts by weight of polybutadiene latex (calculated as solids) with a mean particle diameter $d_{50}$ of 432 nm and a gel content of 81 wt. %).

ABS Graft Polymer 8 (According to the Invention)

29 parts by weight (calculated as solids) of an anionically emulsified polybutadiene latex with a mean particle diameter $d_{50}$ of 305 nm and a gel content of 55 wt. %, produced by free-radical seed polymerization using a polybutadiene latex with a mean particle diameter $d_{50}$ of 111 nm, and 29 parts by weight (calculated as solids) of an anionically emulsified polybutadiene latex with a mean particle diameter $d_{50}$ of 404 nm and a gel content of 81 wt. % produced by free-radical seed polymerization using a polybutadiene seed latex with a mean particle diameter $d_{50}$ of 137 nm, are adjusted with water to a solids content of ca. wt. %, heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 9 (According to the Invention)

29 parts by weight (calculated as solids) of an anionically emulsified polybutadiene latex with a mean particle diameter $d_{50}$ of 305 nm and gel content of 55 wt. %, produced by free-radical seed polymerization using a polybutadiene seed latex with a mean particle diameter $d_{50}$ of 111 nm, and 29 parts by weight (calculated as solids) of an anionically emulsified polybutadiene latex with a mean particle diameter $d_{50}$ of 405 nm and a gel content of 75 wt. % produced by free-radical seed polymerization using a polybutadiene seed latex with a mean particle diameter $d_{50}$ of 137 nm, are adjusted with water to a solids content of ca. 20 wt. %, heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 10 (According to the Invention)

29 parts by weight (calculated as solids) of an anionically emulsified polybutadiene latex with a mean particle diameter $d_{50}$ of 305 nm and a gel content of 55 wt. %, produced by free-radical seed polymerization using a polybutadiene seed latex with a mean particle diameter $d_{50}$ of 111 nm, and 29 parts by weight (calculated as solids) of an anionically emulsified polybutadiene latex with a mean particle diameter $d_{50}$ of 412 nm and a gel content of 84 wt. % produced by free-radical seed polymerization using a polybutadiene seed latex with a mean particle diameter $d_{50}$ of 137 nm, are adjusted with water to a solids content of ca. 20 wt. %, heated to 59° C., following which 0.5 part by weight of potassium peroxodisulfate (dissolved in water) is added.

42 parts by weight of a mixture of 73 wt. % of styrene, 27 wt. % of acrylonitrile and 0.12 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

ABS Graft Polymer 11 (According to the Invention)

50 parts by weight (calculated as solids) of an anionically emulsified polybutadiene latex with a mean particle diameter $d_{50}$ of 137 nm and a gel content of 88 wt. %, produced by free-radical seed polymerization using a polybutadiene seed latex with a mean particle diameter $d_{50}$ of 48 nm are adjusted with water to a solids content of ca. 20 wt. % heated to 59° C., following which 0.5 part by weight of potassium peroxodisulfate (dissolved in water) is added.

50 parts by weight of a mixture of 73 wt. % of styrene, 27 wt. % of acrylonitrile and 0.15 part by weight of tert.-dodecyl mercaptan are then metered in uniformly within 6 hours; parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C. the graft latex is coagulated, after adding ca. 1.0 part by weight of a phenolic antioxidant, with a magnesium sulfate/acetic acid mixture, and after washing with water the resultant moist powder is dried at 70° C.

Resin Component 1
Statistical styrene/acrylonitrile copolymer (styrene:acrylonitrile weight ratio 72:28) with a $\overline{M}_w$ of ca. 115,000 and $\overline{M}_w/\overline{M}_n - 1 \leq 2$ obtained by free-radical solution polymerization Resin Component 2
Statistical styrene/acrylonitrile copolymer (styrene:acrylonitrile weight ration 72:28) with a $\overline{M}_w$ of ca. 85,000 and $\overline{M}_w/\overline{M}_n - 1 \leq 2$ obtained by free-radical solution polymerization Molding Compositions
The aforedescribed polymer components are mixed in an internal kneader in the proportions given in Table 1 together with 2 parts by weight of ethylenediamine bisstearyl amide and 0.1 part by weight of a silicone oil and after granulation are processed into test pieces.

The following data are obtained:

notched impact strength at room temperature ($a_k^{RT}$) and at $-40°$ C. ($a_k^{-40°\ C.}$) according to ISO 180/1A (unit: kJ/m²), ball indentation hardness (Hc) according to DIN 53 456 (unit: N/mm²), thermoplastic flow (MVI) according to DIN 53 735 U (unit: cm³/10 min).

It is clear from the Examples (test data see Table 2) that the products according to the invention exhibit very narrow fluctuation ranges in the most important properties (in particular toughness and processability).

Although the comparison products exhibit similar absolute values for the tested properties, the fluctuation ranges are however much greater.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

The invention claimed is:

1. A polymer composition comprising:
   I) at least one graft rubber polymer obtained by emulsion polymerization of styrene and acrylonitrile in a weight ratio of 95:5 to 50:50, wherein the styrene and/or the acrylonitrile can be partially or completely replaced by α-methylstyrene, methyl methacrylate or N-phenylmaleimide or mixtures thereof, in the presence of a butadiene polymer latex (A) with a mean particle diameter $d_{50}$ of 230 to 330 nm;
   II) at least one graft rubber polymer obtained by emulsion polymerization of styrene and acrylonitrile in a weight ratio of 95:5 to 50:50, wherein the styrene and/or the acrylonitrile can be partially or completely replaced by α-methylstyrene, methyl methacrylate or N-phenylmaleimide or mixtures thereof, in the presence of a butadiene polymer latex (B) with a mean particle diameter $d_{50}$ of 340 to 480 nm;
   III) at least one graft rubber polymer obtained by emulsion polymerization of styrene and acrylonitrile in a weight ratio of 95:5 to 50:50, wherein the styrene and/or the acrylonitrile can be partially or completely replaced by α-methyl styrene, methyl methacrylate or N-phenylmaleimide or mixtures thereof, in the presence of a butadiene polymer latex (C); and
   IV) at least one rubber-free copolymer of styrene and acrylonitrile in a weight ratio of 95:5 to 50:50 wherein the styrene and/or the acrylonitrile can be partially or completely replaced by α-methyl styrene, methyl methacrylate or N-phenylmaleimide or mixtures thereof;

wherein the butadiene polymer latices (A) and (B) are obtained by seed polymerization using at least one butadiene polymer latex (C) with a mean particle diameter of 10 to 220 nm as seed latex, and the graft rubber component III) is obtained by graft polymerization in the presence of at least one butadiene polymer latex (C) used as seed latex for (A) and (B).

TABLE 1

Compositions of the molding compositions

| Example | ABS graft polymer | | | | | | | | | | | Resin Component | |
|---|---|---|---|---|---|---|---|---|---|---|---|---|---|
| | 1 (parts by wt.) | 2 (parts by wt.) | 3 (parts by wt.) | 4 (parts by wt.) | 5 (parts by wt.) | 6 (parts by wt.) | 7 (parts by wt.) | 8 (parts by wt.) | 9 (parts by wt.) | 10 (parts by wt.) | 11 (parts by wt.) | 1 (parts by wt.) | 2 (parts by wt.) |
| 1 | 40 | — | — | — | — | — | — | — | — | — | — | 60 | — |
| 2 | — | 40 | — | — | — | — | — | — | — | — | — | 60 | — |
| 3 | — | — | 40 | — | — | — | — | — | — | — | — | 60 | — |
| 4 | — | — | — | 40 | — | — | — | — | — | — | — | 60 | — |
| 5 (Comparison) | — | — | — | — | 40 | — | — | — | — | — | — | 60 | — |
| 6 (Comparison) | — | — | — | — | — | 40 | — | — | — | — | — | 60 | — |
| 7 (Comparison) | — | — | — | — | — | — | 40 | — | — | — | — | 60 | — |
| 8 | — | — | — | — | — | — | — | 15 | — | — | 15 | — | 70 |
| 9 | — | — | — | — | — | — | — | — | 15 | — | 15 | — | 70 |
| 10 | — | — | — | — | — | — | — | — | — | 15 | 15 | — | 70 |

TABLE 2

Test data of the molding compositions

| Example | $a_k^{RT}$ (kJ/m²) | $a_k^{-40°\ C.}$ (kJ/m²) | Hc (N/mm²) | MVI (cm³/10 min) |
|---|---|---|---|---|
| 1 | 31.2 | 21.3 | 81 | 9.6 |
| 2 | 30.7 | 21.3 | 81 | 9.6 |
| 3 | 31.1 | 21.3 | 80 | 9.4 |
| 4 | 30.9 | 21.7 | 81 | 9.3 |
| 5 (Comparison) | 31.1 | 19.9 | 81 | 7.5 |
| 6 (Comparison) | 29.1 | 17.9 | 84 | 8.7 |
| 7 (Comparison) | 33.4 | 15.3 | 88 | 9.2 |
| 8 | 17.5 | 8.6 | 114 | 33.4 |
| 9 | 16.9 | 8.9 | 114 | 33.9 |
| 10 | 17.0 | 9.2 | 113 | 33.7 |

2. The polymer composition according to claim 1, wherein the butadiene polymer latex (A) has a mean particle diameter $d_{50}$ of 240 to 320 nm,
wherein the butadiene polymer latex (B) has a mean particle diameter $d_{50}$ of 350 to 470 nm
and wherein the at least one butadiene polymer latex (C) has a mean particle diameter of 20 to 210 nm.

3. The polymer composition according to claim 1 further including at least one resin selected from the group consisting of aromatic polycarbonates, aromatic polyester carbonates, polyesters, polyamides and mixtures thereof.

4. The polymer composition according to claim 1, wherein in the production of the graft rubber polymers the monomer feed is carried out such that 55 to 90 wt. % of all the monomers to be used in the graft polymerization are metered in during the first half of the overall time for metering in the monomers and the remaining fraction of the monomers is metered in during the second half of the overall time for metering in the monomers.

5. The polymer composition according to claim 1, wherein in the production of the graft rubber polymers the temperature difference between the start and end of the grafting reaction is at least 15° C.

6. A process for producing a polymer composition according to claim 1 comprising combining
I) at least one graft rubber polymer obtained by emulsion polymerization of styrene and acrylonitrile in a weight ratio of 95:5 to 50:50, wherein the styrene and/or the acrylonitrile can be partially or completely replaced by α-methylstyrene, methyl methacrylate or N-phenylmaleimide or mixtures thereof, in the presence of a butadiene polymer latex (A) with a mean particle diameter $d_{50}$ of 230 to 330 nm;
II) at least one graft rubber polymer obtained by emulsion polymerization of styrene and acrylonitrile in a weight ratio of 95:5 to 50:50, wherein the styrene and/or the acrylonitrile can be partially or completely replaced by α-methylstyrene, methyl methacrylate or N-phenylmaleimide or mixtures thereof, in the presence of a butadiene polymer latex (B) with a mean particle diameter $d_{50}$ of 340 to 480 nm;
III) at least one graft rubber polymer obtained by emulsion polymerization of styrene and acrylonitrile in a weight ratio of 95:5 to 50:50, wherein the styrene and/or the acrylonitrile can be partially or completely replaced by α-methyl styrene, methyl methacrylate or N-phenylmaleimide or mixtures thereof, in the presence of a butadiene polymer latex (C); and
IV) at least one rubber-free copolymer of styrene and acrylonitrile in a weight ratio of 95:5 to 50:50 wherein the styrene and/or the acrylonitrile can be partially or completely replaced by α-methyl styrene, methyl methacrylate or N-phenylmaleimide or mixtures thereof;

wherein the butadiene polymer latices (A) and (B) are obtained by seed polymerization using at least one butadiene polymer latex (C) with a mean particle diameter of 10 to 220 nm as seed latex, and the graft rubber component III) is obtained by graft polymerization in the presence of at least one butadiene polymer latex (C) used as seed latex for (A) and (B).

7. A process for producing polymer compositions according to claim 1, wherein the components I), II) and III) and IV) are mixed, compounded and extruded at elevated temperature.

8. The molded part obtained from the polymer composition according to claim 1.

* * * * *